(12) United States Patent
Kim et al.

(10) Patent No.: US 9,388,520 B2
(45) Date of Patent: *Jul. 12, 2016

(54) WASHING CONTROL METHOD OF A WASHING MACHINE TO PERFORM WASHING USING BUBBLES

(71) Applicant: SAMSUNG ELECTRONICS CO., LTD., Suwon-si, Gyeonggi-do (KR)

(72) Inventors: Hyun Sook Kim, Suwon-si (KR); Seong Min Oak, Masan-si (KR); Sang Yeon Pyo, Suwon-si (KR); Sung Hoon Kim, Suwon-si (KR); Bo Ram Lee, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 239 days.

This patent is subject to a terminal disclaimer.

(21) Appl. No.: 13/936,565

(22) Filed: Jul. 8, 2013

(65) Prior Publication Data

US 2013/0291316 A1    Nov. 7, 2013

Related U.S. Application Data

(63) Continuation of application No. 11/892,405, filed on Aug. 22, 2007, now Pat. No. 8,495,778.

(30) Foreign Application Priority Data

Nov. 1, 2006   (KR) .................. 10-2006-0107214

(51) Int. Cl.
*D06F 35/00* (2006.01)
*D06F 39/02* (2006.01)
(Continued)

(52) U.S. Cl.
CPC .............. *D06F 33/02* (2013.01); *D06F 35/002* (2013.01); *D06F 35/005* (2013.01); *D06F 39/004* (2013.01); *D06F 39/02* (2013.01); *D06F 39/087* (2013.01); *Y02B 40/56* (2013.01)

(58) Field of Classification Search
CPC ..... D06F 35/002; D06F 35/006; D06F 33/02; D06F 39/02; D06F 39/004; D06F 39/087
See application file for complete search history.

(56) References Cited

U.S. PATENT DOCUMENTS 2,023,013 A    12/1935   Faber et al.
5,042,276 A    8/1991   Kamano et al.
(Continued)

FOREIGN PATENT DOCUMENTS

EP           1 477 606        11/2004
KR    10-2000-0043417          7/2000
WO       WO 2006018382         2/2006

OTHER PUBLICATIONS

European Search Report for corresponding Application No. 07115026.2-2314 dated Sep. 15, 2010.
(Continued)

*Primary Examiner* — Joseph L Perrin
(74) *Attorney, Agent, or Firm* — Staas & Halsey LLP

(57) ABSTRACT

A washing control method that is capable of controlling laundry to be effectively washed with bubbles depending upon load of a washing machine. The washing control method includes supplying wash water containing detergent into a space between a lower portion of a rotary drum and a lower inner surface of a water tub; heating the wash water containing detergent; generating and supplying bubbles into the rotary drum; and washing laundry with the supplied bubbles.

9 Claims, 7 Drawing Sheets

(51) Int. Cl.
*D06F 33/02* (2006.01)
*D06F 39/00* (2006.01)
*D06F 39/08* (2006.01)

(56) References Cited

U.S. PATENT DOCUMENTS

| | | | |
|---|---|---|---|
| 5,253,380 A | 10/1993 | Lim et al. | |
| 5,295,373 A | 3/1994 | Lim et al. | |
| 5,307,649 A | 5/1994 | Lim et al. | |
| 5,590,551 A * | 1/1997 | Hong | D06F 17/06 261/76 |
| 6,094,948 A | 8/2000 | Hong et al. | |
| 6,170,303 B1 | 1/2001 | Hong et al. | |
| 2003/0106164 A1 | 6/2003 | Metzger-Groom et al. | |
| 2003/0230122 A1 | 12/2003 | Lee | |
| 2004/0040344 A1 | 3/2004 | Minayoshi et al. | |
| 2005/0034491 A1 | 2/2005 | Tazawa et al. | |
| 2007/0283506 A1 | 12/2007 | Wong et al. | |
| 2008/0028801 A1 | 2/2008 | Czyzewski et al. | |

OTHER PUBLICATIONS

U.S. Office Action issued Sep. 29, 2010 in copending U.S. Appl. No. 11/892,405.
U.S. Office Action issued Mar. 29, 2011 in copending U.S. Appl. No. 11/892,405.
U.S. Office Action issued Oct. 11, 2011 in copending U.S. Appl. No. 11/892,405.
U.S. Office Action issued Jul. 25, 2012 in copending U.S. Appl. No. 11/892,405.
U.S. Notice of Allowance issued Apr. 10, 2013 in copending U.S. Appl. No. 11/892,405.
U.S. Appl. No. 11/892,405, filed Aug. 22, 2007, Hyun Sook Kim et al., Samsung Electronics Co., Ltd.
European Decision on Grant issued Feb. 3, 2016 in corresponding European Patent Application No. 07 115 026.2.

* cited by examiner

WASHING CONTROL METHOD OF A WASHING MACHINE TO PERFORM WASHING USING BUBBLES

CROSS-REFERENCE TO RELATED APPLICATIONS

This application is a continuation of U.S. application Ser. No. 11/892,405, filed Aug. 22, 2007, which claims the benefit of Korean Patent Application No. 10-2006-0107214, filed on Nov. 1, 2006 in the Korean Intellectual Property Office, the disclosures of which are incorporated herein by reference.

BACKGROUND

1. Field

The present invention relates to a washing machine and a washing control method of the same that is capable of washing laundry with bubbles. More particularly, to a washing machine and a washing control method of the same that is capable of controlling laundry to be effectively washed with bubbles depending upon load of the washing machine.

2. Description of the Related Art

A conventional washing machine (for example, a drum type washing machine) is a washing machine, including a drum-type water tub to receive wash water and a cylindrical rotary drum rotatably mounted in the water tub to receive laundry, that washes the laundry by lifting and dropping the laundry in the rotary drum during rotation of the rotary drum.

The conventional washing machine detects the weight of laundry (i.e., the amount of load) to determine the amount of wash water necessary, according to a user's selection of a washing course, then supplies water having an amount sufficient to wet the laundry and detergent into the water tub according to the determined amount of wash water, heats the water and the detergent supplied into the water tub using a heater mounted at the lower part of the washing machine when heating washing is to be performed, and performs a washing operation while the detergent water (i.e., the water plus the detergent), the temperature of which is increased by the heater, is forwarded to the laundry and the laundry is dropped by the rotation of the rotary drum.

However, it is necessary to fill a space defined between the water tub and the rotary drum with water to perform the washing. As a result, a large amount of water is used, and therefore, a large amount of energy is required to increase the temperature of the water. Also, as water consumption increases, a large amount of detergent is used to perform high-concentration washing.

Furthermore, laundry, such as wool or silk requiring delicate washing, may be damaged due to the falling of the laundry, the friction between the water and the laundry and the friction between laundry articles caused by the rotation of the rotary drum.

SUMMARY

Accordingly, it is an aspect of the present invention to provide a washing machine and a washing control method of the same that is capable of performing washing using bubbles, thereby improving the washing efficiency while reducing water consumption.

It is another aspect of the present invention to provide a washing machine and a washing control method of the same that is capable of performing washing using bubbles serving as a cushion to reduce the friction between laundry articles, thereby reducing the damage to laundry when the laundry requires delicate washing and increasing washability by virtue of high-concentration detergent on bubble surfaces.

It is another aspect of the present invention to provide a washing machine and a washing control method of the same that is capable of setting the number of water resupply operations to resupply water by an amount of water reduced by the generation of bubbles depending upon load of the washing machine, thereby supplying water having an amount suitable for the bubble generation.

Additional aspects and/or advantages will be set forth in part in the description which follows and, in part, will be apparent from the description, or may be learned by practice of the invention.

The foregoing and/or other aspects of the present invention are achieved by providing a washing control method of a washing machine to perform washing using bubbles, the method including supplying wash water and detergent into a water tub, heating concentrated detergent liquid including the wash water and the detergent mixed with each other, generating and supplying bubbles into the water tub when the temperature of the heated concentrated detergent liquid reaches a predetermined bubble generation temperature, and washing laundry with the supplied bubbles.

According to an aspect of the present invention, the washing control method further includes wetting the laundry prior to supplying the wash water and the detergent into the water tub to generate the bubbles.

According to an aspect of the present invention, wetting the laundry includes supplying the wash water to wet the laundry, and operating a rotary drum at an RPM and operation rate set, depending upon the amount of laundry for a predetermined period of time.

According to an aspect of the present invention, supplying the wash water and the detergent into the water tub includes supplying the wash water and the detergent into a space defined between a rotary drum, in which the laundry is put, and the water tub such that the wash water and the detergent are not brought into contact with the laundry.

According to an aspect of the present invention, the washing control method further includes detecting a water level of the concentrated detergent liquid including the wash water and the detergent mixed with each other.

According to an aspect of the present invention, the water level of the concentrated detergent liquid is controlled to be maintained at a bubble generation water level at which the bubbles are generated while the concentrated detergent liquid is not in contact with the laundry.

According to an aspect of the present invention, when the water level of the concentrated detergent liquid reaches a first water level at which the concentrated detergent liquid is not in contact with the laundry, the supply of the wash water and the detergent is stopped to control the amount of the concentrated detergent liquid.

According to an aspect of the present invention, when the concentrated detergent liquid is at the bubble generation water level, the bubbles are generated.

According to an aspect of the present invention, when the bubbles are generated exceeding a water level suitable for washing, a rotary drum, in which the laundry is put, is rotated.

According to an aspect of the present invention, the washing control method further includes detecting the water level of the concentrated detergent liquid changed depending upon the bubble generation, and, when the detected water level reaches a second water level which is a minimum water level necessary for the bubble generation, resupplying wash water.

According to an aspect of the present invention, the second water level is a heater safety water level in order to drive a washing heater during hot water washing using bubbles.

According to an aspect of the present invention, the washing control method further includes setting a number of water resupply operations to resupply wash water depending upon the amount of the laundry, and resupplying the wash water includes controlling a water resupply action based on the set number of water resupply operations.

According to an aspect of the present invention, the washing control method further includes, driving continuously a washing heater to heat the concentrated detergent liquid to a user-predetermined temperature, when the temperature of the concentrated detergent liquid reaches the bubble generation temperature, and heating the concentrated detergent liquid to the user-predetermined temperature is carried out along with the bubble generation.

It is another aspect of the present invention to provide a washing machine, having a water tub and a rotary drum to receive laundry, to perform washing using bubbles, the washing machine including a water supply unit to supply wash water, a wash water heating unit to heat concentrated detergent liquid including wash water and detergent mixed with each other, a bubble generation unit to generate bubbles, and a control unit to control the water supply unit to supply the wash water and detergent into a space defined between the water tub and the rotary drum, to control the wash water heating unit to heat the concentrated detergent liquid including the wash water and the detergent mixed with each other, to control the bubble generation unit to generate bubbles from the heated concentrated detergent liquid, and to perform the washing using the generated bubbles.

According to an aspect of the present invention, the washing machine further includes a detergent supply unit to store detergent, and a water supply pipe to supply wash water to the detergent supply unit, wherein the water supply unit supplies the wash water to the detergent supply unit such that the detergent stored in the detergent supply unit is dissolved to form the concentrated detergent liquid.

According to an aspect of the present invention, the washing machine further includes a water replenishment pipe diverging from the water supply pipe to replenish wash water, and the water supply unit directly supplies the wash water into the water tub through the water replenishment pipe (i.e., not through the detergent supply unit).

According to an aspect of the present invention, the control unit controls the water supply unit to directly supply the wash water into the water tub through the water replenishment pipe to wet the laundry before the wash water and the detergent are supplied into the space between the water tub and the rotary drum.

According to an aspect of the present invention, the washing machine further includes a water level detection unit to detect the water level of the concentrated detergent liquid supplied into the space between the water tub and the rotary drum, and the control unit controls the water level of the concentrated detergent liquid supplied into the space between the water tub and the rotary drum.

According to an aspect of the present invention, the water level detection unit includes a water level sensor to detect the water level in the space between the water tub and the rotary drum, and the water level sensor detects a first water level at which the concentrated detergent liquid is not in contact with the laundry, a second water level at which the water level of the concentrated detergent liquid is a minimum water level necessary for the bubble generation, and a third water level necessary to wet the laundry.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
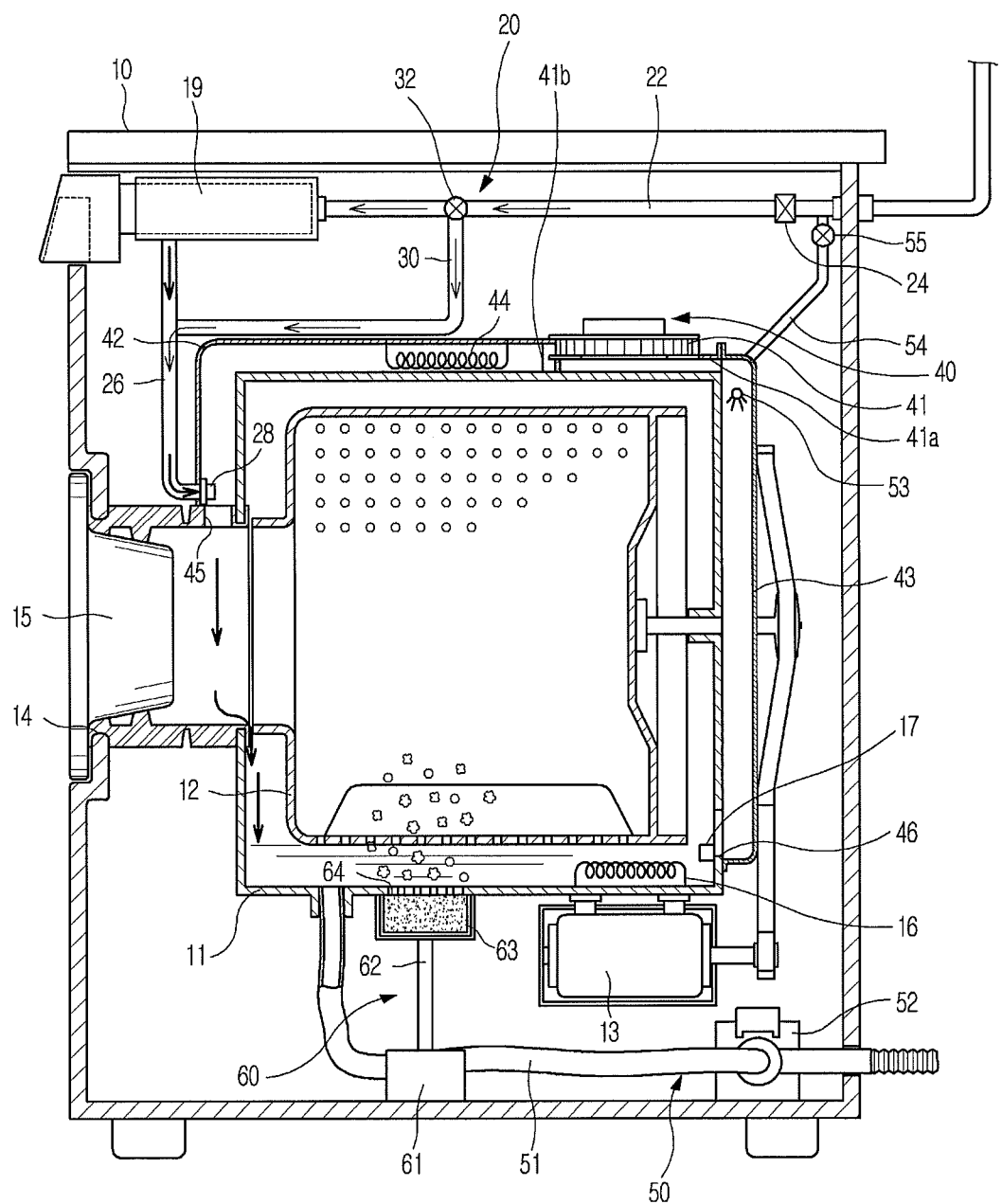
FIG. 1 is a sectional view illustrating the structure of a washing machine according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

FIG. 1 is a sectional view illustrating the structure of a washing machine using bubbles according to an embodiment of the present invention.

As shown in FIG. 1, the washing machine comprises a drum-type water tub 11 mounted in a machine body 1 to receive wash water and a rotary drum 12 rotatably mounted in the water tub 11 and having a plurality of through-holes.

A motor 13 is mounted at the bottom of the water tub 11, to rotate the rotary drum 12 in alternating directions to perform washing, rinsing, and spin-drying operations. In addition, in a lower part of the water tub 11 are mounted both a washing heater 16 to heat the wash water supplied into the water tub 11 according to a user's selection of water temperature, and a water level sensor 17 to detect a frequency changed depending upon the water level of the wash water (or detergent water) supplied into the water tub 11 to detect the amount (i.e., the water level) of the wash water (or the detergent water).

The water level sensor 17, according to an embodiment of the present invention, controls the maximum wash water level at which detergent water is not introduced into the rotary drum 12, in which laundry is put (i.e., an optimum water level necessary for bubble generation; hereinafter, referred to as a first water level), to perform washing using bubbles and the minimum wash water level necessary for the bubble generation (i.e., a safety water level at which the washing heater is submerged in the detergent water; hereinafter, referred to as a second water level). When the amount of the detergent water supplied upon the washing reaches the first water level, the supply of wash water is stopped to prevent the introduction of the detergent water into the rotary drum 12. When the amount of the detergent water is lowered to the second water level due to the bubble generation, wash water is supplied into the water tub 11 to maintain detergent water necessary for the bubble generation.

Further, the water level sensor 17 controls the detergent water to be maintained at a bubble generation water level at which the bubble generation is possible while the detergent water is not in contact with the laundry through the continuous water level detection in addition to the first and second water levels. Furthermore, the water level sensor 17 measures the lowering of the water level through flow rate control or time control during bubble washing to control wash water having an amount necessary for the bubble generation to be supplied.

Also, the water level sensor 17 controls a wash water level at which the laundry is wetted before the bubble generation (i.e., a wetting water level between the first water level and the second water level; hereinafter, referred to as a third water level). The laundry is controlled to be wetted before the bubble generation such that bubbles easily permeate into the laundry during washing.

Openings 14 are formed in the front of the water tub 11 and the rotary drum 12, the openings are opened and closed by a door 15 mounted at the front of the machine body 10.

A detergent supply unit 19 to supply detergent and a water supply unit 20 to supply wash water are mounted above the water tub 11.

The detergent supply unit 19 has several partitioned spaces. The detergent supply unit 19 is mounted at the front side of the machine body 10 such that a user easily puts detergent and rinse in the partitioned spaces.

The water supply unit 20 comprises a water supply pipe 22 to supply wash water, and a water supply valve 24 mounted on the water supply pipe 22 to control the supply of wash water through the water supply pipe 22. The water supply pipe 22 is connected to the detergent supply unit 19 such that water can be supplied from the outside to the detergent supply unit 19.

A connection pipe 26 is mounted between the detergent supply unit 19 and the water tub 11, through which the wash water having passed through the detergent supply unit 19 is supplied to the water tub 11 together with the detergent. At the outlet of the connection pipe 26 is mounted a water supply nozzle 28, through which the detergent in the detergent supply unit 19 is supplied into the water tub 11 together with the wash water to receive high-concentration detergent water for bubble generation in a space defined between the water tub 11 and the rotary drum 12.

Also, the water supply unit 20 further comprises a water replenishment pipe 30 connected with the water supply pipe 22 to replenish wash water to wet the laundry before bubble generation or replenish wash water necessary for bubble generation when the water level is lowered due to the bubble generation and a water replenishment valve 32 mounted on the water replenishment pipe 30 to control the replenishment of wash water to the water tub 11. The water replenishment pipe 30 is connected to the connection pipe 26 such that water passing through the water supply pipe 22 is directly supplied to the water tub 11 via the water replenishment pipe 30 not through the detergent supply unit 19.

The water replenishment valve 32, according to an embodiment of the present invention, comprises a three-way valve to control the flow of the wash water such that the wash water passing through the water supply pipe 22 is supplied to the detergent supply unit 19 or the water replenishment pipe 30.

The washing machine, according to an embodiment of the present invention, further comprises a drying unit 40 to dry laundry (clothes).

The drying unit 40 comprises a drying fan 41 mounted at the top of the water tub 11, a drying duct 42 connected between an outlet port 41b of the drying fan 41 and an air inlet port 45 formed at the upper side of the opening 14 of the water tub 11, and an condensing duct 43 mounted at the rear of the water tub 11 to connect an air outlet port 46 formed at the lower part of the rear side of the water tub 11 and an inlet port 41a of the drying fan 41.

The drying unit 40 further comprises a drying heater 44 mounted in the drying duct 42 to supply hot air into the water tub 11 and an condensing unit 49 mounted in the condensing duct 43 to condense wet steam generated during drying of the clothes.

The condensing unit 49 comprises a cooling water injection nozzle 53 mounted in upper part of the condensing duct 43 to inject cooling water into the condensing duct 43 and a cooling water supply pipe 54 and a cooling water valve 55 connected to the water supply unit 20 to supply cooling water to the cooling water injection nozzle 53.

Consequently, cooling water injected from the cooling water injection nozzle 53 falls downward along the condensing duct 43 with the result that the cooling water is brought into contact with wet air rising upward, whereby the dehumidification efficiency is improved.

The washing machine according to an embodiment of the present invention, further comprises a drainage unit 50 to drain water out of the water tub 11. The drainage unit 50 includes a drainage pipe 51 connected with the bottom of the water tub 11, to guide the water in the water tub 11 to the outside and a drainage pump 52 mounted at the drainage pipe 51.

The washing machine, according to an embodiment of the present invention, further comprises an air supply unit 60 to supply air such that the laundry in the rotary drum 12 is washed by bubbles. The air supply unit 60 comprises an air motor 61 mounted below the water tub 11 to supply air, an air supply pipe 62 to forward the air supplied by the air motor 61, and a porous member 63 mounted at one end of the air supply pipe 62 to disperse the supplied air. The air supplied by the air motor 61 passes through the porous member 63 via the air supply pipe 62. At this time, the air is dispersed to generate bubbles in detergent water having concentrated detergent liquid and wash water mixed with each other. Consequently, it is possible to wash the laundry in the rotary drum 12 only using the bubbles.

In the water tub 11 where the air supply unit 60 is mounted are formed air holes 64, through which air from the air supply unit 60 is flows. Consequently, air dispersed by the porous member 63 is introduced into a space between the water tub 11 and the rotary drum 12 through the air holes 64.

Figure 2:
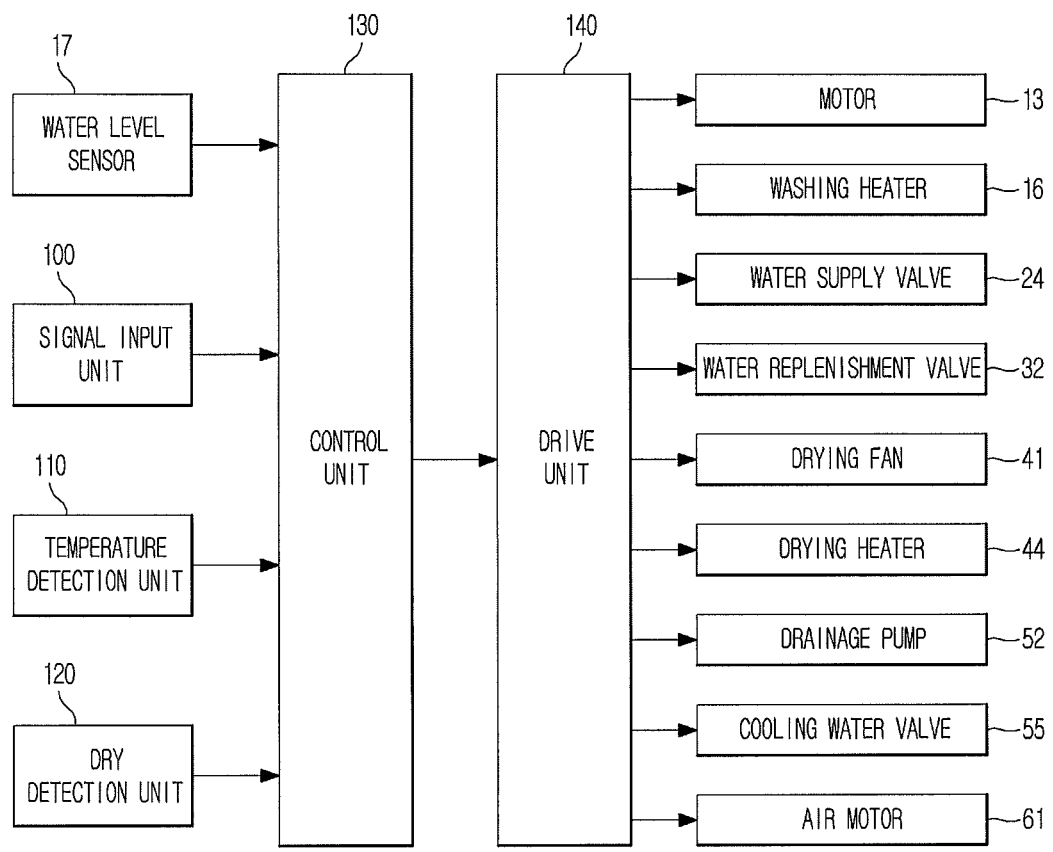
FIG. 2 is a control block diagram of a washing control unit of the washing machine according to an embodiment of the present invention.

FIG. 2 is a control block diagram of a washing control unit of the washing machine according to an embodiment of the present invention. In addition to the components shown in FIG. 1, the washing machine further comprises a signal input unit 100, a temperature detection unit 110, a dry detection unit 120, a control unit 130, and a drive unit 140.

The signal input unit 100 inputs operation information, such as a washing course (for example, bubble washing or normal washing) selected by a user depending upon kinds of laundry and a washing temperature (hereinafter, referred to as a predetermined temperature), spin-drying RPM, and addition of rinsing set by the user, to the control unit 130.

The temperature detection unit 110 detects the temperature of wash water supplied into the water tub 11, and the dry detection unit 120 detects the temperature and the humidity of the laundry to detect the dryness of the laundry.

The control unit 130 is a microcomputer to control the washing machine based on the operation information inputted from the signal input unit 100. The control unit 130 stores motor RPM and operation rate (motor on-off time), washing time, and the number of water resupplies N (i.e., the number of water resupply operations to resupply water to the first water level necessary for bubble generation when the water level is lowered due to the bubble generation) set depending upon the amount of load (weight of laundry) in the selected washing course.

Consequently, the control unit 130 controls the amount of wash water to be supplied together with the bubble generation during bubble washing, controls the motor RPM and operation rate depending upon the amount of load, and controls the start point of the bubble generation depending upon the temperature of wash water (i.e., water temperature). Specifically, the control unit 130 controls the driving of the motor 13, the water supply unit 20, and the air motor to accomplish the optimum washing efficiency while reducing the damage to the laundry.

Also, the control unit 130 controls the motor RPM or the driving of the water supplying unit 20 or the drying unit 40 to effectively remove the bubbles after the bubble washing.

The drive unit 140 drives the motor 13, the washing heater 16, the water supply valve 24, the water replenishment valve 32, the drying fan 41, the drying heater 44, the drainage pump 52, the cooling water valve 55, and the air motor 61 according to a drive control signal of the control unit 130.

Hereinafter, the operation of the washing machine with the above-stated construction and a washing control method of the washing machine according to an embodiment of the present invention, will be described.

According to the washing control method, it is possible to perform a normal washing course to wash normal laundry and a bubble washing course to wash laundry using bubbles. The above-described signal input unit 100 includes a button to input a command to perform the bubble washing course to the control unit 130.

Figure 3:
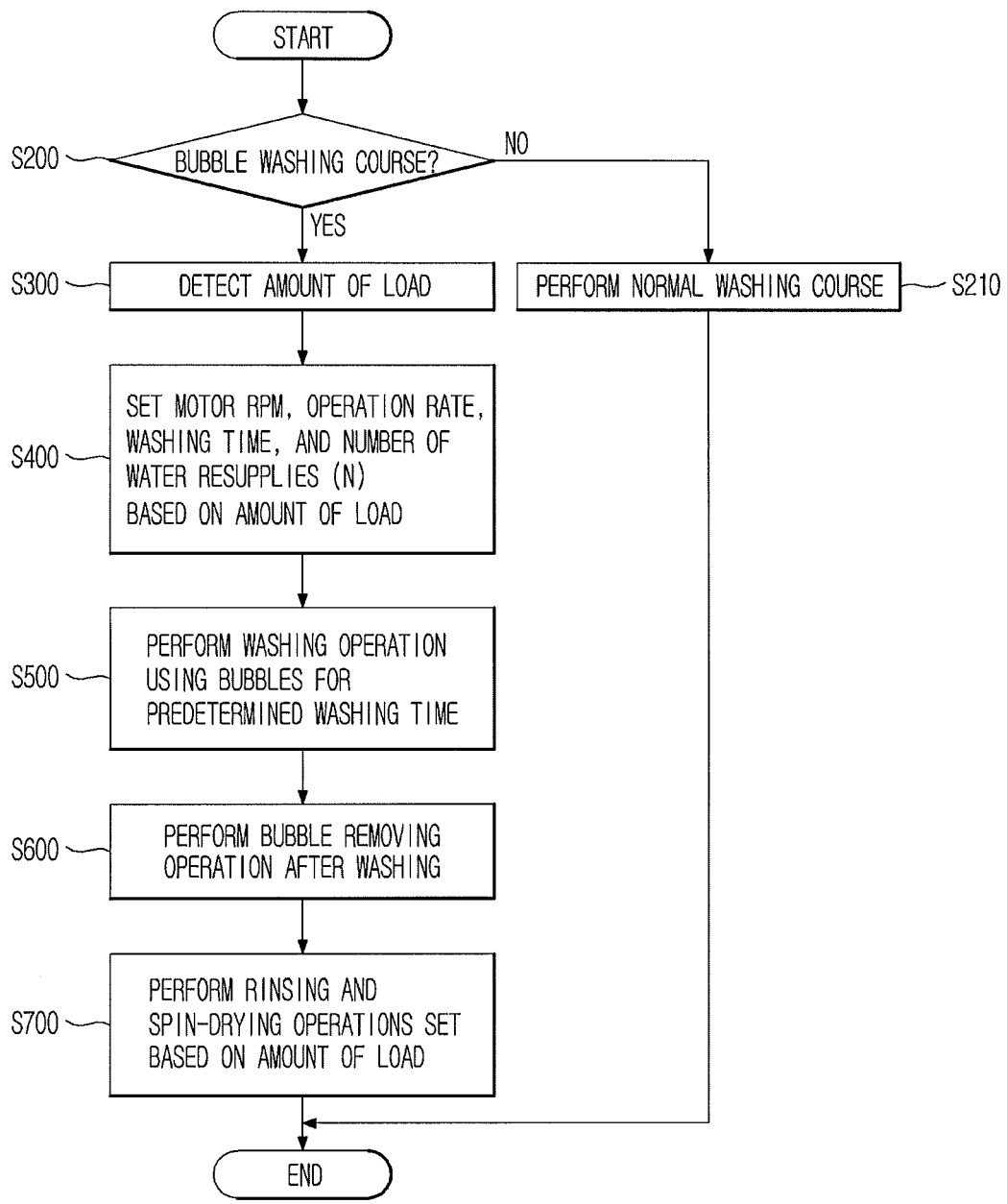
FIG. 3 is a flow chart illustrating a washing control method using bubbles in the washing machine according to an embodiment of the present invention.

FIG. 3 is a flow chart illustrating a washing control method using bubbles in the washing machine according to an embodiment of the present invention.

When a user puts laundry in the rotary drum 12 and selects operation information, such as a washing course (i.e., a bubble washing course or a normal washing course), washing temperature, spin-drying RPM, and addition of rinsing, based on kinds of the laundry, the operation information selected by the user is inputted to the control unit 130 through the signal input unit 100.

Subsequently, in operation 200, the control unit 130 determines whether the washing course selected by the user is the bubble washing course based on the operation information inputted from the signal input unit 100. When washing course selected is not the bubble washing course, the process moves to operation 210, where the control unit 130 controls the normal washing course to be performed.

When the washing course selected by the user is the bubble washing course, the process moves to operation 300, where the control unit 130 detects the amount of load (weight of the laundry) put in the rotary drum 12 and sets the amount of wash water, the motor RPM and operation rate (motor on-off time), washing time, and the number of water resupplies N (i.e., the number of water resupply operations to resupply water to the first water level necessary for bubble generation when the water level is lowered due to the bubble generation) based on the detected amount of load in operation 400.

According to an embodiment of the present invention, setting the number of water resupplies N is to restrict water resupply actions depending upon the amount of laundry, thereby reducing unnecessary water supply actions.

Subsequently, the process moves to operation 500, where the control unit 130 performs a washing operation using bubbles for the predetermined washing time based on the amount of wash water, the motor RPM and operation rate, washing time, and the number of water resupplies N, all of which are set by the control unit 130. After the bubble washing, the process moves to operation 600 where the control unit 130 performs a bubble removing operation to effectively remove bubbles left in the rotary drum 12.

In the washing operation using bubbles, according to an embodiment of the present invention, the bubbles serve as a cushion when the friction between laundry articles occurs, whereby the damage to the laundry due to the friction between the laundry articles and strong water stream is reduced. Also, contaminants are effectively removed from the laundry using a small amount of water by virtue of high detergent concentration of the bubbles, whereby energy is saved.

After the washing operation using bubbles is performed, and the bubbles are removed, the process moves to operation 700, where rinsing and spin-drying operations set based on the amount of load are performed.

Hereinafter, the process for performing the washing course using bubbles (operation 500), which is the technical characteristic of the present invention, will be described with reference to FIGS. 4A and 4B.

Figure 4A:
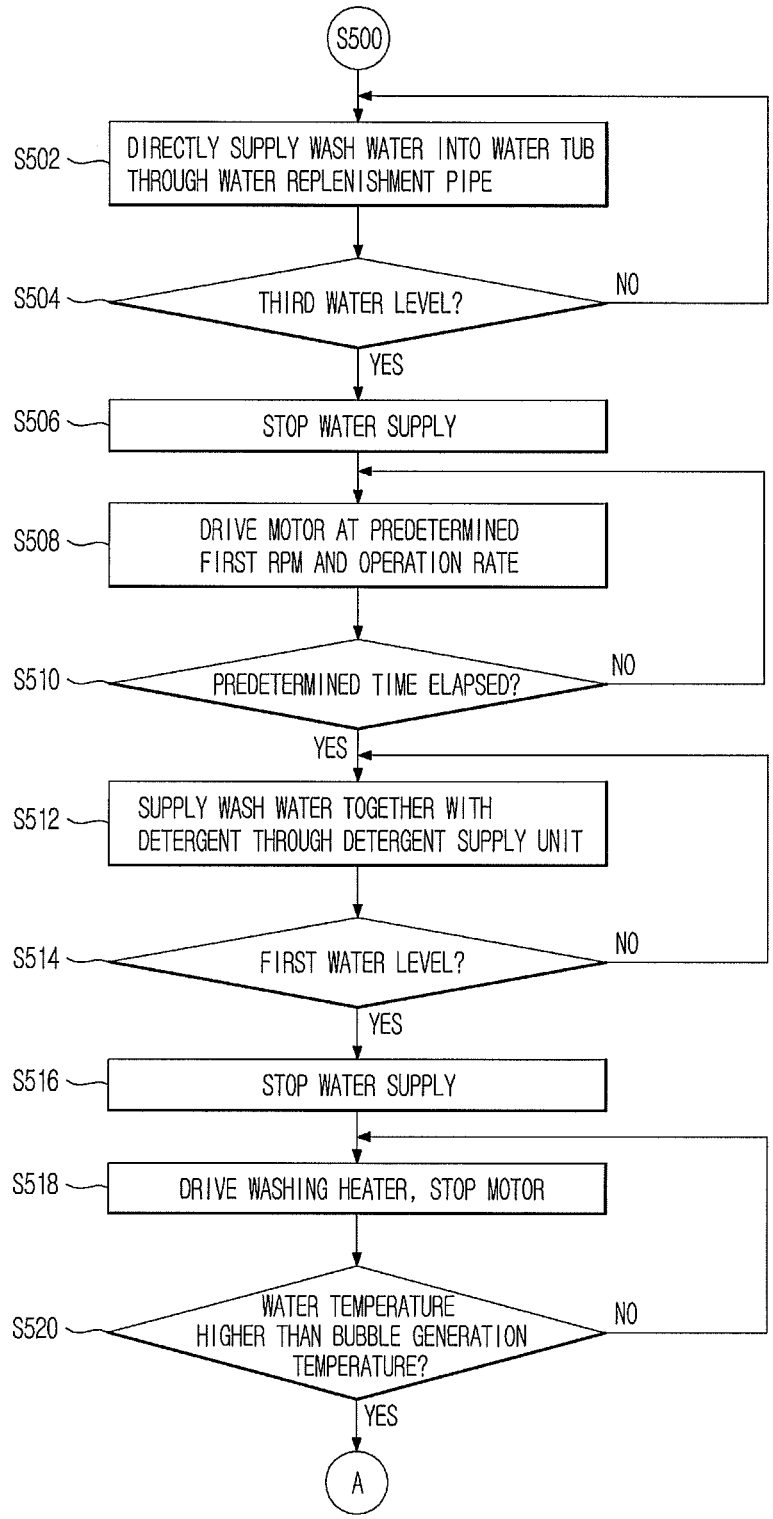
FIGS. 4A and 4B are flow charts illustrating a washing operation using bubbles in the washing machine according to an embodiment of the present invention.
Figure 4B:
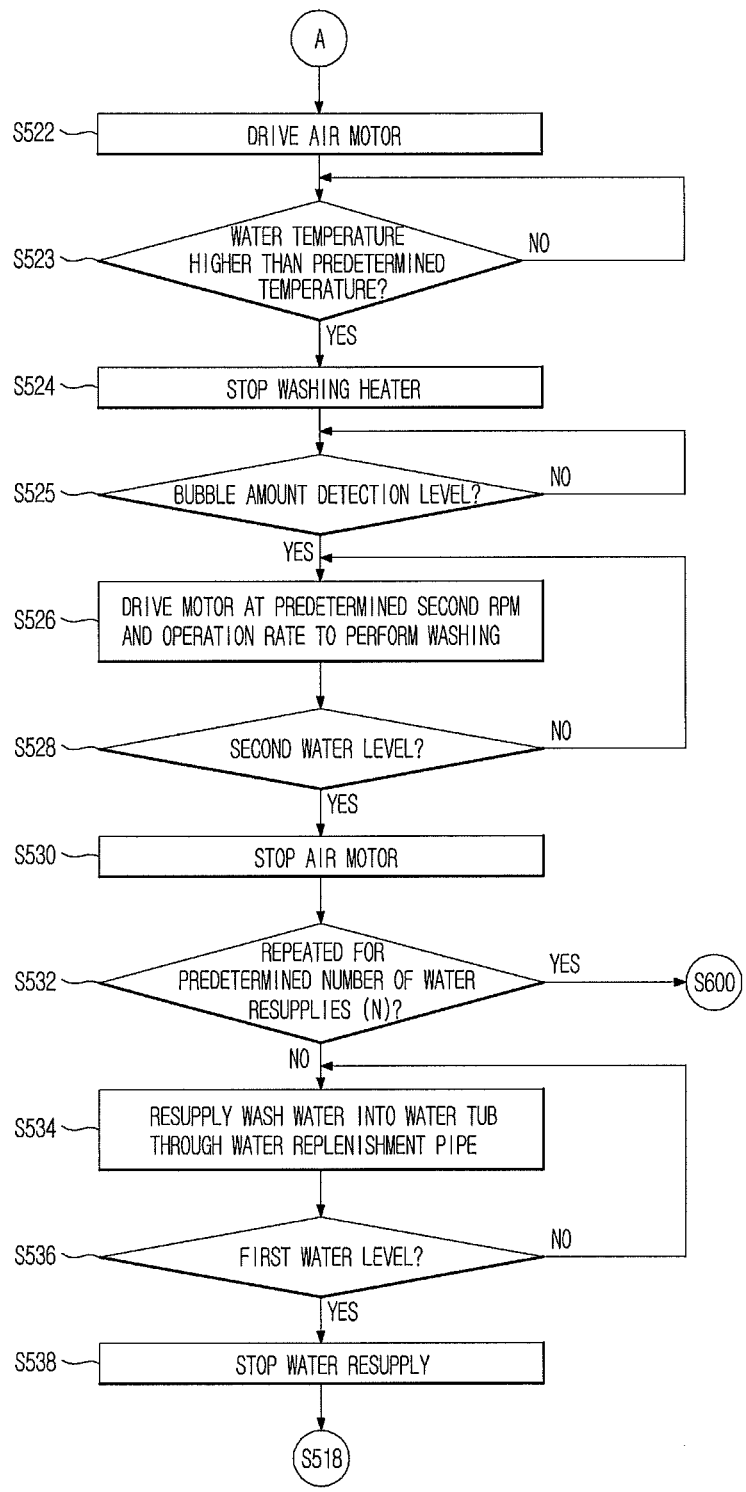

FIGS. 4A and 4B are flow charts illustrating a washing operation using bubbles in the washing machine according to an embodiment of the present invention.

When the bubble washing course is selected, as shown in FIG. 4A, the process moves to operation 502, where the control unit 130 controls the water supply valve 24 and the water replenishment valve 32 such that wash water to wet the laundry is not supplied to the detergent supply unit 19 through the water supply pipe 22 but directly to the water tub 11 through the water replenishment pipe 30, the connection pipe 26, and the water supply nozzle 28.

This is to wet the laundry, before the bubble generation, to effectively perform the washing operation using bubbles such that the volume of the laundry is reduced, and therefore, the bubbles easily permeate into the laundry.

As the wash water necessary to wet the laundry is directly supplied into the water tub 11, the process moves to operation 504, where the water level sensor 17 detects the water level of the wash water supplied into the water tub to determine whether the water level is the predetermined third water level (i.e., the wetting water level at which the laundry is wetted).

When the water level of the wash water is not the third water level, wash water continues to be directly supplied into the water tub 11 until the water level of the wash water reaches the third water level. When the water level of the wash water is the third water level, the process moves to operation 506, where the control unit 130 turns the water supply valve 24 and the water replenishment valve 32 off to stop the water supply.

After the water supply is stopped, the process moves to operation 508, where the control unit 130 drives the motor 13 to operate the rotary drum 12 at a predetermined first RPM (less than the washing RPM) and a predetermined operation rate such that the laundry is wetted by the water supplied into the water tub 11.

During the wetting operation, the RPM and the operation rate of the rotary drum 12 are equal to or less than values set for the respective washing courses depending upon the amount of load.

Subsequently, in operation 510, the control unit 130 counts a motor driving time to wet the laundry to determine whether a predetermined time (approximately 5 minutes) has elapsed. When the predetermined time has elapsed, the control unit 130 controls the water supply valve 24 and the water replenishment valve 32 to supply high-concentration detergent water necessary for bubble generation such that the wash water is supplied into the water tub 11 through the water supply pipe 22 and the detergent supply unit 19. At this time, the detergent in the detergent supply unit 19 is dissolved by the wash water and supplied together with the wash water into the water tub 11 through the connection pipe 26 and the water supply nozzle 28 with the result that concentrated detergent liquid (the wash water containing the detergent in a concentrated state) is supplied into the lower part of the water tub 11 (specifically, the space between the water tub and the rotary drum) in operation 512.

As described above, the control is performed such that the wash water to wet the laundry is first supplied at the beginning of the water supply, and then the wash water is supplied with the detergent in the detergent supply unit 19.

As the wash water containing the detergent is supplied into the water tub 11, the space between the water tub 11 and the rotary drum 12 is filled with the concentrated detergent liquid including the detergent and the wash water mixed with each other. At this time, the process moves to operation 514, where the water level of the concentrated detergent liquid is detected by the water level sensor 17 to determine whether the water level is the predetermined first water level (the maximum wash water level at which the wash water supplied into the tub is not introduced into the rotary drum; approximately ¼ of the normal wash water level).

When the water level of the concentrated detergent liquid is not the first water level, detergent and wash water continue to be supplied until the water level of the concentrated detergent liquid reaches the first water level. When the water level of the concentrated detergent liquid is the first water level, the process moves to operation 516, where the control unit 130 turns the water supply valve 24 and the water replenishment valve 32 off to stop the supply of wash water.

Subsequently, the washing heater 16 is driven to heat the detergent water to a temperature suitable for bubble generation and the motor 13 is stopped such that the laundry in the rotary drum 12 is washed with the bubbles.

At this time, the amount of water supplied into the space between the water tub 11 and the rotary drum 12 is less than that of water in the normal washing operation. Consequently, the water is rapidly heated by the washing heater 16, and therefore, the total washing time is reduced and energy necessary to heat the water is saved.

Subsequently, in operation 520, the temperature of the detergent water (water temperature) heated by the washing heater 16 is detected by the temperature detection unit 110 to determine whether the detected temperature exceeds a predetermined bubble generation temperature (a temperature at which bubbles are easily generated; approximately 30° C.).

When the water temperature does not exceed the bubble generation temperature, the washing heater 16 continues to be driven until the water temperature reaches the bubble generation temperature. When the water temperature exceeds the bubble generation temperature in operation 520, the process moves to operation 522 shown in FIG. 4B, where the control unit 130 drives the air motor 61 to generate bubbles such that air is supplied into the detergent water including the detergent and the wash water mixed with each other to generate bubbles. The bubbles are generated as follows: air supplied by the air motor 61 passes through the porous member 63 via the air supply pipe 62 with the result that the air is dispersed. The dispersed air is introduced into the detergent water including the detergent and the wash water mixed with each other through the air holes 64, whereby bubbles are generated.

In this embodiment, the bubble generation using the porous member 63 was described, however, the present invention is not limited to the above-described construction and may vary as necessary.

The bubbles generated in the space between the water tub 11 and the rotary drum 12 is introduced into the rotary drum 12 through the through-holes or the opening of the rotary drum 12. The bubble introduced into the rotary drum 12 is dispersed throughout the rotary drum 12 after a predetermined time (approximately 3 minutes), and therefore, the laundry in the rotary drum 12 is washed only using the bubbles.

At this time, the process moves to operation 523, where the control unit 130 determines whether the water temperature exceeds a user-predetermined temperature when the bubbles are generated by the driving of the air motor 61. When the water temperature exceeds the predetermined temperature in operation 523, the process moves to operation 524, where the control unit 130 stops the driving of the washing heater to interrupt the heating of the wash water.

This is to heat the concentrated detergent liquid to the user-predetermined temperature (the minimum of approximately 40° C.) after heating the concentrated detergent liquid to the bubble generation temperature at which the bubbles are easily generated (approximately 30° C.) through the driving of the washing heater 16. When the concentrated detergent liquid is heated by the washing heater 16 and the temperature of the heated concentrated detergent liquid reaches the user-predetermined temperature, the washing heater 16 is stopped with the result that the hot water washing using the bubbles is performed at the optimum conditions desired by the user.

Subsequently, the process moves to operation 525, where the control unit 130 determines whether the bubbles introduced into the rotary drum 12 exceeds a bubble amount detection level (a level at which bubbles having an amount suitable for the washing progress are generated after the bubble generation is initiated at the first water level; a level at which approximately ⅓ of the rotary drum is filled with the bubbles).

When the bubbles exceeds the bubble amount detection level, the control unit 130 drives the motor 13 to operate the rotary drum 12 at a predetermined second RPM (less than the washing RPM) and operation rate such that the washing is performed using the bubbles in operation 526.

During the bubble generation, the predetermined RPM, operation rate, and washing time of the rotary drum 12 are equal to or less than values set depending upon the amount of load.

The bubbles are dispersed throughout the rotary drum 12 by the rotation of the rotary drum 12 together with the bubble generation, and contaminants are effectively removed from the laundry by high detergent concentration of the dispersed bubbles. At this time, the bubbles serve as a cushion when the laundry falls and the friction between laundry articles occurs due to the rotation of the rotary drum 12, whereby the damage to the laundry is prevented.

As the washing operation using the bubbles progresses, the amount of the concentrated detergent liquid is reduced. At this time, the process moves to operation 528, where the water level of the concentrated detergent liquid is detected by the water level sensor 17 to determine whether the water level is the predetermined second water level (i.e., the minimum wash water level necessary for the bubble generation). That is, the safety water level at which the washing heater is submerged in the concentrated detergent liquid.

When the water level of the concentrated detergent liquid is not the second water level, the bubble generation is continued and the washing is performed while the rotary drum 12 is rotated until the water level of the concentrated detergent liquid reaches the second water level. When the water level of the concentrated detergent liquid is the second water level, the control unit 130 stop the air motor 61 to interrupt the bubble generation in operation 530.

When the water level of the concentrated detergent liquid reaches the second water level, and therefore, the air motor 61 is stopped, the process moves to operation 532, where the control unit 130 determines whether water resupply operations to resupply water necessary for bubble generation have been repeated the predetermined number of water resupplies N.

When it is determined at operation 532 that the water resupply operations have not been repeated the predetermined number of water resupplies N, the process moves to operation 534, where the control unit 130 controls the water supply valve 24 and the water replenishment valve 32 such that the wash water is not supplied to the detergent supply unit 19 through the water supply pipe 22 but to the water tub 11 through the water replenishment pipe 30, the connection pipe 26, and the water supply valve 28 to further supply water necessary for the bubble generation in order to maintain the bubble generation water level necessary for the bubble generation.

As the wash water is further supplied into the water tub 11, the water level in the space between the water tub 11 and the rotary drum 12 is detected by the water level sensor 17 to determine whether the detected water level is the predetermined first water level in operation 536.

When the detected water level is not the predetermined first water level, wash water continues to be further supplied (resupplied) into the water tub 11 until the water level of the wash water reaches the first water level. When the water level is the first water level, the control unit 130 turns the water supply valve 24 and the water replenishment valve 32 off to stop the further supply of water (water resupply) (in operation 538). Then, the process returns to operation 518, which is performed to maintain the water level necessary for the bubble generation until the performance is repeated the predetermined number of water resupplies N.

Figure 5:
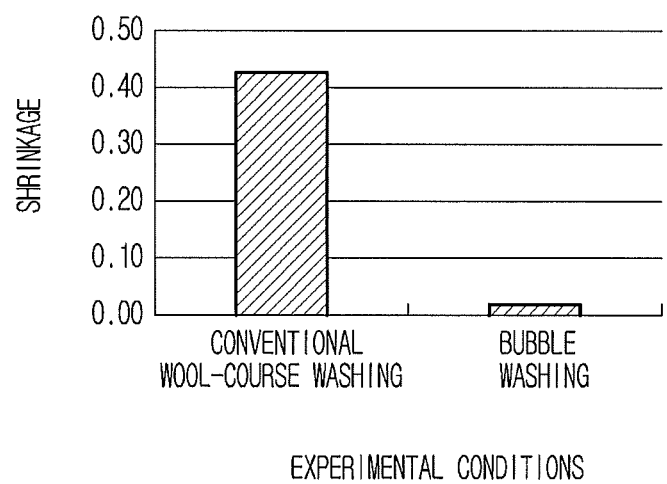
FIG. 5 is a graph illustrating shrinkages of laundry when the laundry is washed by a conventional wool-course washing operation compared to a washing operation using bubbles at the same concentration.
Figure 6:
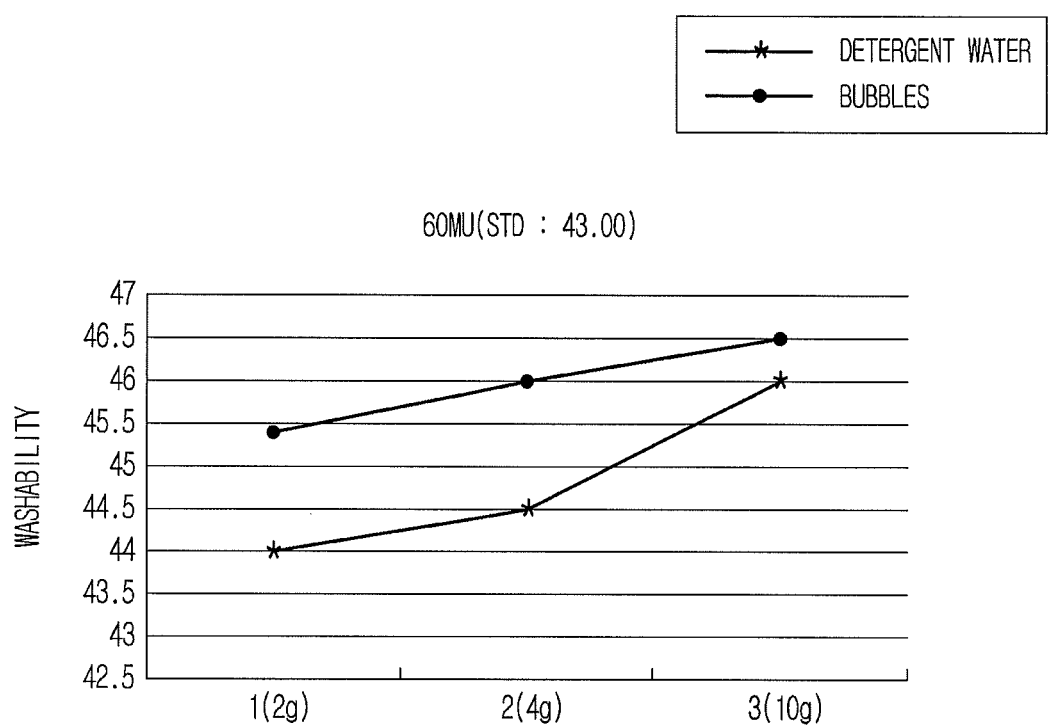
FIG. 6 is a graph illustrating washabilities when 60MU contaminated cloth is washed using detergent water and bubbles at the same concentration.

The results of the washing operation using bubbles are shown in FIGS. 5 and 6.

FIG. 5 is a graph illustrating shrinkages of laundry when the laundry is washed by a conventional wool-course washing operation compared to a washing operation using bubbles at the same concentration.

Specifically, FIG. 5 illustrates the shrinkage of the laundry according to the conventional wool-course washing operation in the following conditions: RPM 25, operation rate 1 second ON and 78 seconds OFF, and washing time 10 minutes. The shrinkage of the laundry according to the bubble washing operation in the same condition as the conventional wool-course washing operation, i.e., the following conditions: RPM 25, operation rate 1 second ON and 78 seconds OFF, and washing time 10 minutes.

It can be seen from FIG. 5 that the shrinkage of the laundry was considerably reduced in the bubble washing operation as compared with the conventional wool-course washing operation.

FIG. 6 is a graph illustrating washabilities when 60MU (Make Up) contaminated cloth is washed using detergent water and bubbles at the same concentration. Specifically, the graph shows reflexibility (%) at amounts of detergent having the same concentration (2g, 4g, and 10g).

It can be seen from FIG. 6 that the washability in the washing operation using the bubbles was higher than that in the washing operation using the normal detergent water.

As apparent from the above description, the washing machine according to an embodiment of the present invention and the washing control method of the same have the effect of performing washing using bubbles, thereby improving the washing efficiency while reducing water consumption. Also, the bubbles serve as a cushion to reduce the friction between laundry articles. Consequently, the washing machine according to an embodiment of the present invention and the washing control method of the same have the effect of reducing the damage to laundry when the laundry requires delicate washing and increasing washability by virtue of high-concentration detergent on bubble surfaces.

Furthermore, the washing machine according to an embodiment of the present invention and the washing control method of the same have the effect of setting the number of water resupplies to resupply water by the amount of water reduced by the generation of bubbles depending upon load of the washing machine, thereby supplying water having an amount suitable for the bubble generation, and therefore, controlling the water level using the optimum amount of water without waste or shortage of water.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A washing control method of a washing machine to perform washing using bubbles, the method comprising:
   supplying wash water without detergent to a water tub;
   operating a rotary drum disposed in the water tub;
   supplying, detergent liquid including wash water and detergent, into a space between the water tub and the rotary drum;
   heating, by a washing heater, the detergent liquid to a predetermined temperature;
   when the detergent liquid has reached the predetermined temperature, generating, by a bubble generation unit installed outside the water tub, bubbles from the heated detergent liquid, and introducing the generated bubbles into the rotary drum;
   detecting a water level of the detergent liquid changed depending upon the bubble generation;
   supplementarily supplying wash water without detergent to the wash tub when the detected water level of the detergent liquid reaches a second water level which is the minimum water level of the detergent liquid necessary for the bubble generation; and
   washing laundry with the supplied bubbles.

2. The washing control method according to claim 1, wherein supplying the detergent liquid into the space between the water tub and the rotary drum comprises:
   supplying the detergent liquid into the space defined between the rotary drum, in which the laundry is put, and the water tub such that the detergent liquid is not brought into contact with the laundry in the rotary drum.

3. The washing control method according to claim 1, further comprising:
   detecting a water level of the detergent liquid by a water level detection unit.

4. The washing control method according to claim 3, wherein the water level of the detergent liquid is controlled to be maintained at a bubble generation water level at which the bubbles are generated, while the detergent liquid is not in contact with the laundry.

5. The washing control method according to claim 4, wherein, when the water level of the detergent liquid reaches a first water level at which the detergent liquid is not in contact with the laundry, the supply of the detergent liquid is stopped to control the amount of the detergent liquid.

6. The washing control method according to claim 4, wherein, when the detergent liquid is at the bubble generation water level, the bubbles are generated.

7. The washing control method according to claim 6, further comprising:
   rotating the rotary drum, in which the laundry is put, when the generated bubbles reach a level suitable for washing.

8. The washing control method according to claim 1, wherein the second water level is a heater safety water level necessary to drive a washing heater during hot water washing using bubbles.

9. The washing control method according to claim 1, further comprising:
   driving continuously a washing heater to heat the detergent liquid to a user-predetermined temperature after heating the detergent liquid to a bubble generation temperature,
   wherein heating the detergent liquid to the user-predetermined temperature is carried out along with the bubble generation.

* * * * *